US008207703B2

(12) United States Patent
Kurose et al.

(10) Patent No.: US 8,207,703 B2
(45) Date of Patent: Jun. 26, 2012

(54) PROTECTION DEVICE FOR ASSEMBLED BATTERY AND ASSEMBLED BATTERY SYSTEM CONTAINING THE SAME

(75) Inventors: Daisuke Kurose, Kawasaki (JP); Tetsuro Itakura, Tokyo (JP); Yoshinao Tatebayashi, Yokohama (JP); Nobuo Shibuya, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 12/399,154

(22) Filed: Mar. 6, 2009

(65) Prior Publication Data

US 2009/0167244 A1     Jul. 2, 2009

Related U.S. Application Data

(63) Continuation-in-part of application No. PCT/JP2008/065349, filed on Aug. 21, 2008.

(30) Foreign Application Priority Data

Aug. 24, 2007   (JP) .................................. 2007-218763

(51) Int. Cl.
    *H02J 7/00* (2006.01)
(52) U.S. Cl. ......................................... 320/116; 702/63
(58) Field of Classification Search .................... 320/116
    See application file for complete search history.

(56) References Cited

U.S. PATENT DOCUMENTS

| | | | |
|---|---|---|---|
| 5,932,932 A | 8/1999 | Agatsuma et al. | |
| 6,081,095 A | 6/2000 | Tamura et al. | |
| 6,268,710 B1 * | 7/2001 | Koga | 320/116 |
| 6,362,627 B1 * | 3/2002 | Shimamoto et al. | 324/434 |
| 6,404,165 B1 | 6/2002 | Shinpo et al. | |
| 6,639,408 B2 * | 10/2003 | Yudahira et al. | 324/434 |
| 7,193,390 B2 * | 3/2007 | Nagai et al. | 320/116 |
| 7,332,891 B2 * | 2/2008 | Sugimoto | 320/116 |
| 7,656,164 B2 * | 2/2010 | Kawamura | 324/434 |
| 7,663,375 B2 * | 2/2010 | Yonezawa | 324/434 |
| 7,772,803 B2 * | 8/2010 | Jaeger et al. | 320/116 |

(Continued)

FOREIGN PATENT DOCUMENTS

EP           1737097        12/2006

(Continued)

OTHER PUBLICATIONS

International Search Report for PCT/JP2008/065349 mailed on Feb. 5, 2009.
Japanese Office Action for Application No. 2007-218763 mailed on May 24, 2011.

*Primary Examiner* — Ramy Ramadan
(74) *Attorney, Agent, or Firm* — Turocy & Watson, LLP

(57) ABSTRACT

A protection device for an assembled battery includes a sampling capacitor, first switches and second switches to sample the voltages of the battery cells and hold the voltages in the capacitor, a detection unit which detects the voltages of the battery cells based on the voltage sampled by any one of the first switches and the second switches and held on the capacitor and output the detected value, a computing unit which computes an average value of the detected values, a comparator which compares the detected value with the average value so as to obtain a result of comparison indicating a relation in size between the both, and a controller which controls the first switches and the second switches, for the second switches to sample if the detected value obtained by sampling by the first switches is higher than the average value according to the comparison result.

10 Claims, 8 Drawing Sheets

U.S. PATENT DOCUMENTS

| | | | |
|---|---|---|---|
| 7,851,946 B2* | 12/2010 | Oyama et al. | 307/109 |
| 7,876,071 B2* | 1/2011 | Chen et al. | 320/136 |
| 7,924,016 B2* | 4/2011 | Shimizu | 324/434 |
| 2001/0026161 A1* | 10/2001 | Furukawa | 324/679 |
| 2006/0091857 A1* | 5/2006 | Nakanishi et al. | 320/116 |
| 2006/0192529 A1* | 8/2006 | Kimura et al. | 320/116 |
| 2006/0261677 A1 | 11/2006 | Shibuya et al. | |
| 2007/0211503 A1* | 9/2007 | Oyama et al. | 363/62 |
| 2008/0239628 A1 | 10/2008 | Tatebayashi et al. | |
| 2010/0007351 A1* | 1/2010 | Kurose et al. | 324/429 |

FOREIGN PATENT DOCUMENTS

| | | |
|---|---|---|
| JP | 11-055866 | 2/1999 |
| JP | 11-103534 | 4/1999 |
| JP | 11-262188 | 9/1999 |
| JP | 2000-083327 | 3/2000 |
| JP | 2001-201522 | 7/2001 |
| JP | 2007-006552 | 1/2007 |

* cited by examiner

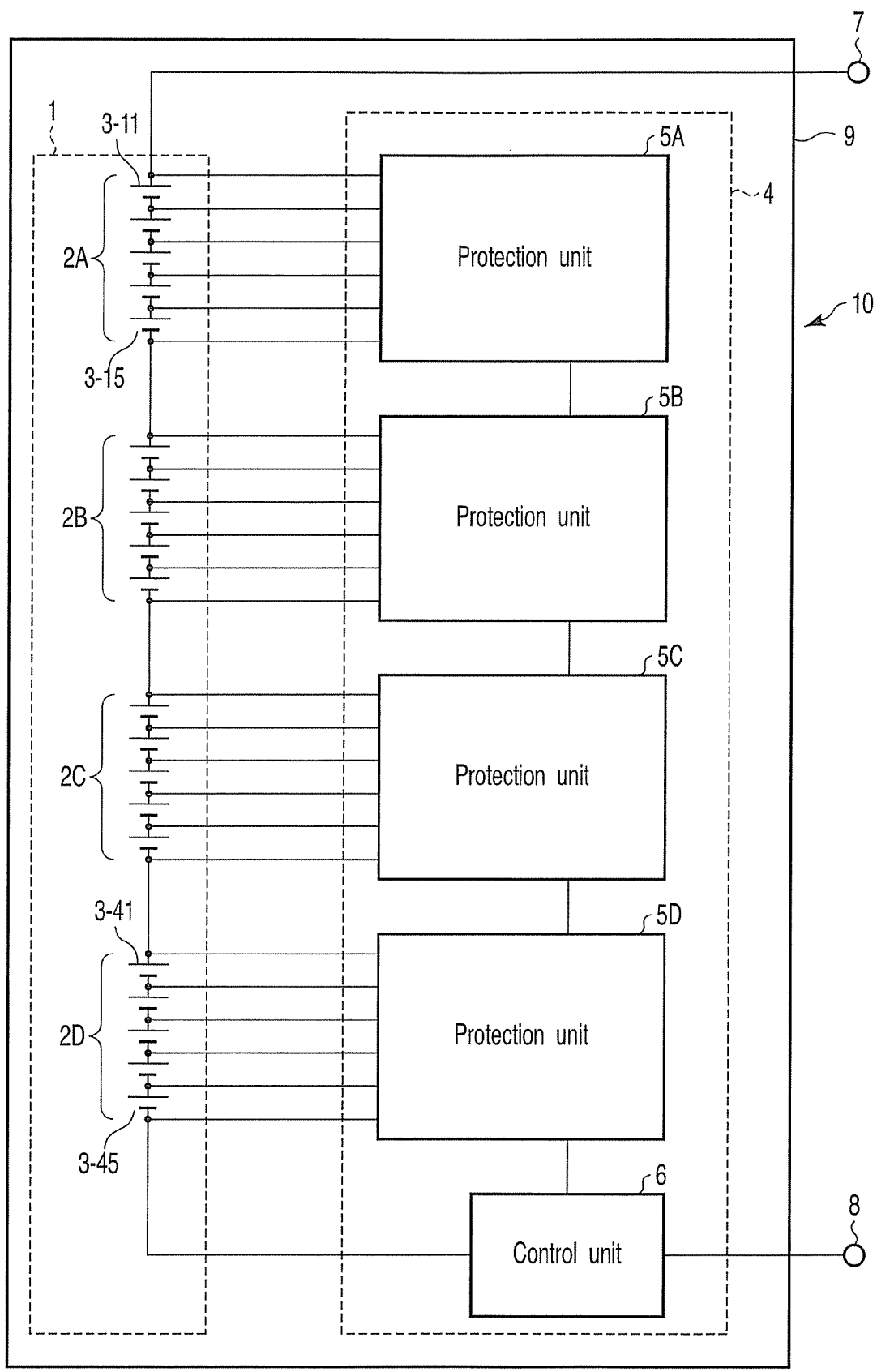
F I G. 1

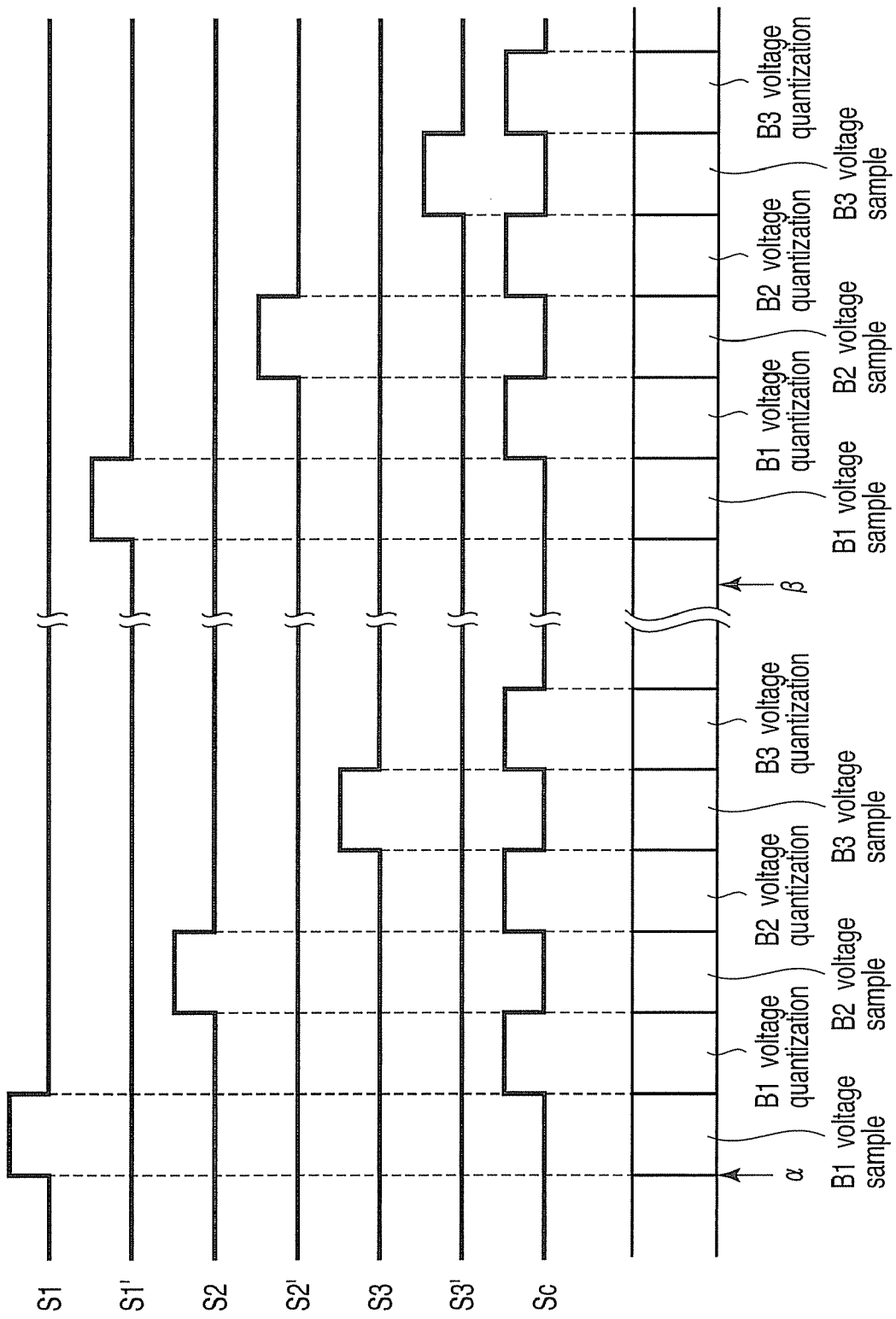
F I G. 3

PROTECTION DEVICE FOR ASSEMBLED BATTERY AND ASSEMBLED BATTERY SYSTEM CONTAINING THE SAME

CROSS REFERENCE TO RELATED APPLICATIONS

This is a Continuation Application of PCT Application No. PCT/JP2008/065349, filed Aug. 21, 2008, which was published under PCT Article 21 (2) in English.

This application is based upon and claims the benefit of priority from prior Japanese Patent Application No. 2007-218763, filed Aug. 24, 2007, the entire contents of which are incorporated herein by reference.

BACKGROUND OF THE INVENTION

1. Field of the Invention

The present invention relates to a protection device for an assembled battery having a function of correcting dispersion of voltage among battery cells and an assembled battery system containing the same.

2. Description of the Related Art

In recent years, an electric vehicle and a hybrid vehicle have been attracting public attention in viewpoints of reduction of environmental load. A vehicle mounted battery which determines the traveling performance of the electric vehicle and the hybrid vehicle is demanded to have a high voltage of more than several tens of volts to enable the motor to be driven. For the reason, as the vehicle mounted battery, an assembled battery in which a plurality of battery cells each having a voltage of about 2 V are connected in series is used.

For the assembled battery, dispersion among the battery cells is problematic. Although the same current flows in each battery cell because the battery cells are connected in series, the voltages are different if the capacity is dispersed. If the voltages of the battery cells are different, there is a battery cell whose voltage reaches an upper voltage limit and other battery cell whose voltage drops to a lower voltage limit when it is discharged. Because the battery cell whose voltage reaches the upper voltage limit is in an over-charged state and the battery cell whose voltage reaches the lower voltage limit is in an over-discharged state, deterioration of battery performance is induced. To prevent the over-charge and over-discharge of the battery cell, the dispersion of voltage among the battery cells needs to be corrected.

JP-A H11-055866 (KOKAI) has disclosed an art for correcting the dispersion of voltage among the battery cells. According to JP-A H11-055866 (KOKAI), a voltage detection circuit is possessed in the battery so as to detect the voltage of each battery cell. By discharging charges of the battery cell whose voltage is higher than an average voltage via a switch and a resistor according to a result of this voltage detection, the voltages are adjusted to that average. By adjusting the voltage of each cell battery to the average, the dispersion of the voltage is corrected.

Although JP-A 2001-201522 (KOKAI) has disclosed a flying capacitor voltage detection circuit for the assembled battery, JP-A 2001-201522 (KOKAI) does not consider correction of the dispersion of voltages.

In JP-A H11-055866 (KOKAI), a dispersion correcting circuit having a switch for connecting a resistor and both ends of the battery cell to a resistor is required as well as the voltage detection circuit, thereby increasing the total quantity of devices. Because the increase of the devices leads to increases in area and cost if the protection devices incorporating the voltage detection circuit and the dispersion correcting circuit are integrated as for example, a semiconductor IC, it is desirable to use as small a quantity of the devices as possible.

BRIEF SUMMARY OF THE INVENTION

An object of the present invention is to provide a protection device for an assembled battery having voltage dispersion correcting function of achieving a reduced area and reduced cost in integration of the battery cells by reducing the quantity of devices, and an assembled battery system containing the protection device.

According to one aspect of the present invention, there is provided a protection device for an assembled battery having a plurality of battery cells connected in series, comprising: at least one sampling capacitor; first switches which are placed between an end of the battery cells and an end of the capacitor and between the other end of the battery cells and the other end of the capacitor so as to sample the voltages of the battery cells and hold the voltages in the capacitor; second switches which are placed between the end of the battery cells and the other end of the capacitor and between the other end of the battery cells and the end of the capacitor so as to sample the voltages of the battery cells and hold the voltages in the capacitor; a detection unit which detects the voltages of the battery cells based on the voltage sampled by any one of the first switches and the second switches and held on the capacitor and outputs the detected value; an arithmetic unit which computes an average value of the detected values corresponding to each of the battery cell; a comparator which compares the detected value with the average value so as to obtain a result of comparison indicating a relation in size between the both; and a controller which controls the first switches and the second switches, for the second switches to sample if the detected value obtained by sampling by the first switches is higher than the average value according to the comparison result.

BRIEF DESCRIPTION OF THE SEVERAL VIEWS OF THE DRAWING

FIG. 1 is a block diagram showing schematically a protection device of an assembled battery and an assembled battery system according to an embodiment of the present invention;

FIG. 3 is a timing chart showing an operation of a switch in the first embodiment;

DETAILED DESCRIPTION OF THE INVENTION

Figure 2:
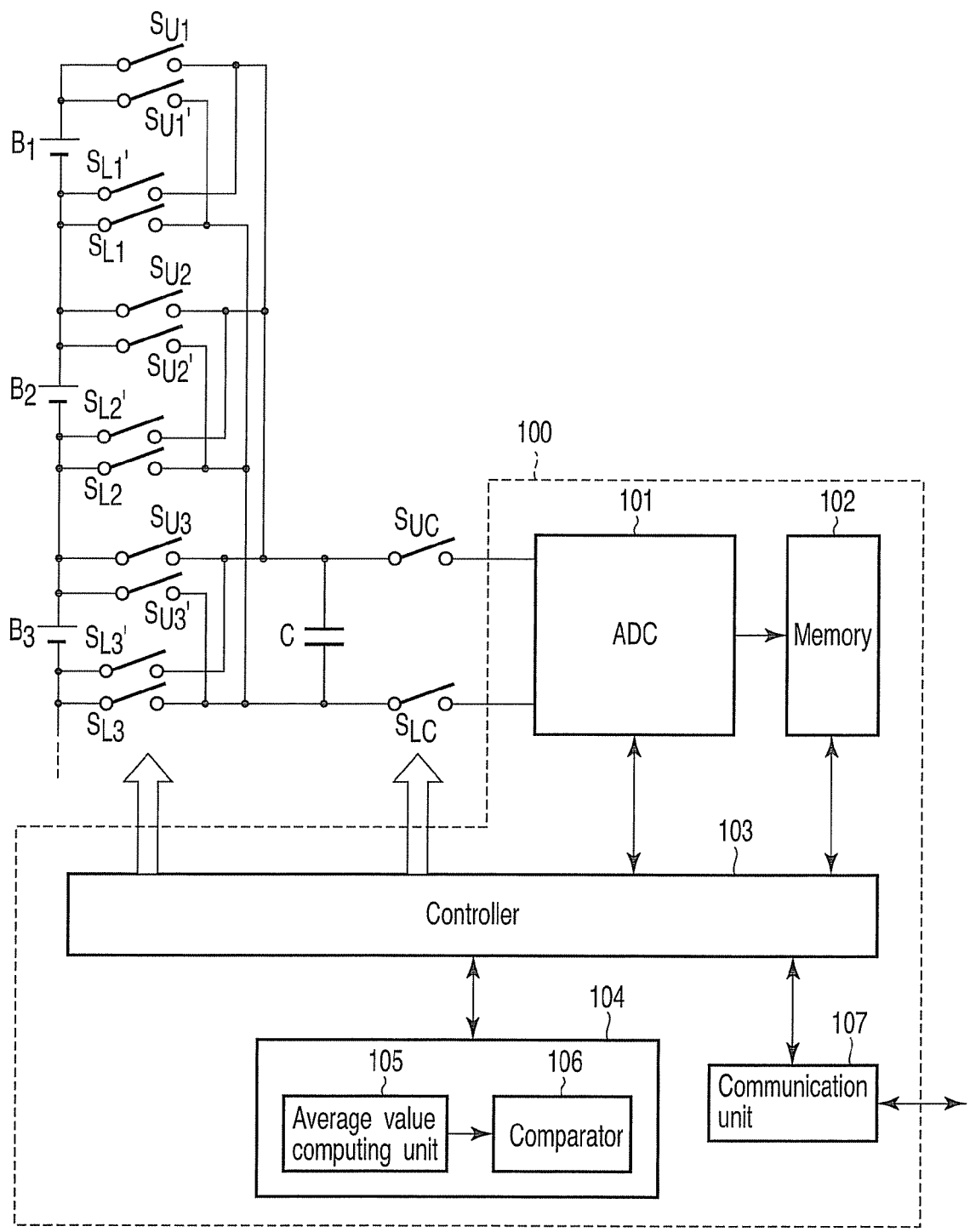
FIG. 2 is a circuit diagram showing a protection unit according to the first embodiment.

Hereinafter, embodiments of the present invention will be described with reference to the drawings.

As shown in FIG. 1, the protection device for the assembled battery according to an embodiment of the present invention is applied to an assembled battery 1 constituted of a plurality of battery modules 2A to 2D connected in series, each having a plurality of cell batteries 3-nm (n=1 to 4, m=1 to 5 in an example of FIG. 1) connected in series. As the cell battery 3-nm, a secondary battery, for example, a lithium ion battery is used. An end of the assembled battery 1 is connected to an external connecting terminal 7 while the other end is connected to an external terminal 8 through a control unit 6.

A protection device 4 includes protection units 5A to 5D connected to the battery modules 2A to 2D and the control unit 6 common to the battery modules 2A, 2B, 2C, and 2D. Although the protection device 4 may be sometimes incorporated in another casing than the assembled battery 1, it may be sometimes incorporated in a casing 9 together with the assembled battery 1 so that it is used as an assembled battery system (called battery pack) 10 together with the assembled battery 1.

FIG. 2 shows one of the protection units 5A to 5D. When the voltage of each cell (hereinafter referred to as cell voltage) of the battery modules 2A to 2D reaches a charge prohibiting voltage at the time of charging, basically the protection units 5A to 5D execute a charge prohibiting operation and when the cell voltage reaches a discharge prohibiting voltage at the time of discharge, execute a discharge prohibiting operation as its basic function. However, description of such a basic function is omitted here.

Although in FIG. 2, three B1, B2 and B3 are represented as the cell battery contained in the battery module corresponding to a protection unit, actually, a plurality of the cell batteries exist as described above.

A flying capacitor voltage detection circuit is connected to the cell batteries B1, B2 and B3. The flying capacitor voltage detection circuit is described in FIG. 11 of the above-mentioned JP-A 2001-201522 (KOKAI) and it can detect a cell voltage without use of any amplifier like a voltage detection circuit described in JP-A H11-055866 (KOKAI). In FIG. 2, the capacitor C corresponds to a flying capacitor. The cell voltage, that is, a terminal voltage of the battery cells B1, B2 and B3 is sampled and held in a capacitor C and then, inputted to an analog-digital converter (ADC) 101 to be quantized, in order to detect the cell voltage. Hereinafter, the capacitor C is referred to as sampling capacitor.

According to this embodiment, the flying capacitor voltage detection circuit and the voltage dispersion correcting circuit are shared about at least part of the elements in the protection unit so as to reduce the quantity of devices. Hereinafter, various embodiments of the protection unit in FIG. 2 will be described in detail.

(First Embodiment)

As shown in FIG. 2, an end of two sampling switches $S_{U1}$, $S_{U1'}$, $S_{U2}$, $S_{U2'}$ and $S_{U3}$, $S_{U3'}$ is connected to a positive terminal of the cell batteries B1, B2 and B3. An end of two sampling switches $S_{L1}$, $S_{L1'}$, $S_{L2}$, $S_{L2'}$ and $S_{L3}$, $S_{L3'}$ is connected to a negative terminal of the cell batteries B1, B2 and B3.

Although in JP-A 2001-201522 (KOKAI), only sampling switches corresponding to $S_{U1}$, $S_{U2}$, $S_{U3}$ and $S_{L1}$, $S_{L2}$, $S_{L3}$ exist, according to this embodiment, $S_{U1'}$, $S_{U2'}$, $S_{U3'}$ and $S_{L1'}$, $S_{L2'}$, $S_{L3'}$ are added newly. By adding these sampling switches $S_{U1'}$, $S_{U2'}$, $S_{U3'}$ and $S_{L1'}$, $S_{L2'}$, $S_{L3'}$, correction of voltage dispersion of the battery cells B1, B2, and B3 is achieved.

The voltages of the battery cells B1, B2, and B3 sampled by the newly added sampling switches S.sub.U1', S.sub.U2' and S.sub.U3' and S.sub.L1', S.sub.L2', S.sub.L3' are sampled by the sampling switches S.sub.U1, S.sub.U2, S.sub.U3 and S.sub.L1, S.sub.L2, S.sub.L3 and then, given to the sampling capacitor C with a reverse polarity to a voltage held on the sampling capacitor C.

To give the cell voltage sampled by the sampling switches $S_{U1'}$, $S_{U2'}$, $S_{U3'}$ and $S_{L1'}$, $S_{L2'}$, $S_{L3'}$ to the sampling capacitor C with a reverse polarity to the cell voltage sampled by the sampling switches $S_{U1}$, $S_{U2}$, $S_{U3}$ and $S_{L1}$, $S_{L2}$, $S_{L3}$, the other ends of $S_{U}1$, $S_{U1'}$, $S_{U2}$, $S_{U2'}$ and $S_{U3}$, $S_{U3'}$ are connected to the sampling capacitor C reversely. That is, the other ends of $S_{U1}$, $S_{U2}$ and $S_{U3}$ are connected to an end of the sampling capacitor C and the other ends of $S_{U1'}$, $S_{U2'}$ and $S_{U3'}$ are connected to the other end of the sampling capacitor C.

Likewise, the other ends of $S_{L1}$, $S_{L1'}$, $S_{L2}$, $S_{L2'}$ and $S_{L3}$, $S_{L3'}$ are connected to the sampling capacitor C reversely. That is, the other ends of $S_{L1}$, $S_{L2}$, $S_{L3}$ are connected to the ends of the sampling capacitor C and the other ends of $S_{L1'}$, $S_{L2'}$, $S_{L3'}$ are connected to an end of the sampling capacitor C.

A microcontroller 100 which is achieved by MPU is an ADC-equipped microcontroller and includes an ADC 101, a memory 102, a controller 103, an arithmetic unit 104 and a communication unit 107 and the arithmetic unit 104 includes an average value computing unit 105 and a comparator 106. Although the communication unit 107 is provided to communicate with other protection unit and the control unit 6, detailed description of the communication unit is omitted here.

An end and the other end of the sampling capacitor C are connected to a positive input terminal and a negative input terminal of the ADC 101 through transmission switches $S_{UC}$ and $S_{LC}$. A voltage detected value of the ADC 101 which quantizes a voltage sample-held on the sampling capacitor C and converts to digital signal, that is, a voltage detected value of the battery cells B1, B2, and B3 is given to a memory 102. The controller 103 controls the sampling switch and the transmission switch.

The average value computing unit 105 computes an average value of the voltage detected values of the battery cells B1, B2 and B3 which are outputted from the ADC 101 and memorized in the memory 102 under a control of the controller 103. The comparator 106 compares a voltage detected value with a computed average value. A result of comparison is given to the controller 103 and used for switch control.

Figure 4:
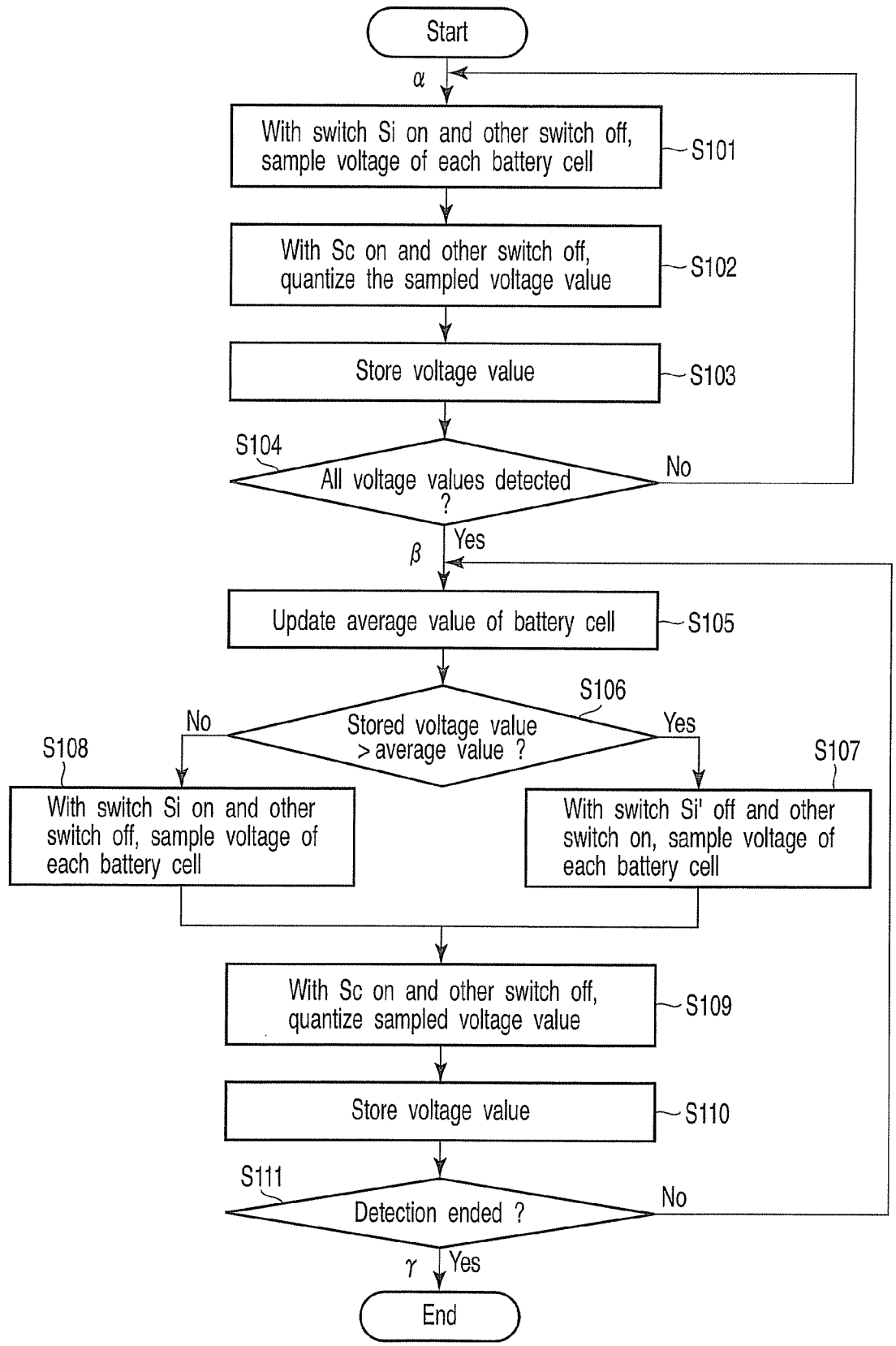
FIG. 4 is a flow chart showing a procedure in the first embodiment.

Next, an operation of this embodiment will be described using a time chart of FIG. 3 indicating the operation timing of the switch and a flow chart of FIG. 4.

First, switches $S_i$ (i=U1 to U3, L1 to L3) are turned on successively to sample voltages of the battery cells B1, B2 and B3 and the sampled voltages are given to the sampling capacitor C (step S101). The voltage of the sampling capacitor C is quantized successively by the ADC 101 (step S102) and stored in the voltage detected value (step S103). Steps S101 to S103 are repeated until it is determined that voltages of all the battery cells B1, B2 and B3 are detected. An operation up to here corresponds to a section from α to β in FIGS. 3 and 4.

In the meantime, S1, S2 and S3 in FIG. 3 indicate operations of $S_{U1}$, $S_{L1}$, $S_{U2}$, $S_{L2}$ and $S_{U3}$, $S_{L3}$ and S1', S2' and S3' indicate operations of $S_{U1'}$, $S_{L1'}$, $S_{U2'}$, $S_{L2'}$ and $S_{U3'}$, $S_{L3'}$.

Next, average values of the voltage detected values of the battery cells B1, B2 and B3 stored in the memory 102 are computed to update the average value (step S105). Next, a voltage detected value of the battery cells B1, B2, and B3 sampled last time is compared with an average value stored in the memory 102 (step S106). As a result of this comparison, if the voltage detected value is higher than the average value, switches $S_{i'}$ (i=U1 to U3, L1 to L3) are turned on successively and the voltages of the battery cells B1, B2, and B3 are sampled successively and given to the sampling capacitor C (step S107). Then, the transmission switch $S_C$ (C=UC, LC) is turned on and the voltage of the sampling capacitor C is quantized successively by the ADC 101 (step S109) and further the voltage detected value is stored in the memory 102 (step S110).

Assuming that the voltage of the sampling capacitor C before sampling is V and the voltage of a battery cell to be sampled is Vb, at the time of processing in step S107, charge of (Vb+V)C is consumed from that battery cell. That is, assuming that the capacity of the battery cell is Cb, the voltage of a battery cell having a higher voltage than the average value can be corrected by only −(Vb+V)/Cb.

Generally, the capacity of the sampling capacitor C is very small as compared with a capacity Cb of the battery cell. However, because voltage detection operation is always carried out repeatedly, the voltage of the battery cell is brought close to the average value gradually by such a voltage correcting operation with a time passage.

When the voltage of the battery cell becomes equal to the average value, the switch $S_i$ is turned on to sample (step S108) and the procedure proceeds to step S109. At this time, the charge (Vb−V)C is consumed from the battery cell. However, the voltage V of the sampling capacitor before sampling becomes substantially equal to Vb if the charge of the sampling capacitor C is not consumed when it is quantized by the ADC 101. Therefore, in a sampling state by turning the switch $S_i$ on, little charge is consumed from the battery cell.

If it is determined that the voltage values of all the battery cells B1, B2 and B3 are detected in step S111, processing after step S105 is repeated.

By the way, in this embodiment, the polarity of voltage of the sampling capacitor C differs between when the voltage of the battery cell is sampled with the switch $S_i$ and when it is sampled with the switch $S_{i'}$. By reversing the polarities of the output digital value from the ADC 101 between when the switch $S_i$ is on and when the switch $S_{i'}$ is on by a control from the controller 103, the polarities of the output digital values from the ADC 101 can be matched.

According to this embodiment, by sharing elements of the voltage detection circuit and the voltage dispersion correcting circuit, the quantities of devices of the protection devices for the assembled battery and the assembled battery system can be reduced, so that reductions in area and cost when they are integrated.

(Second Embodiment)

Figure 5:
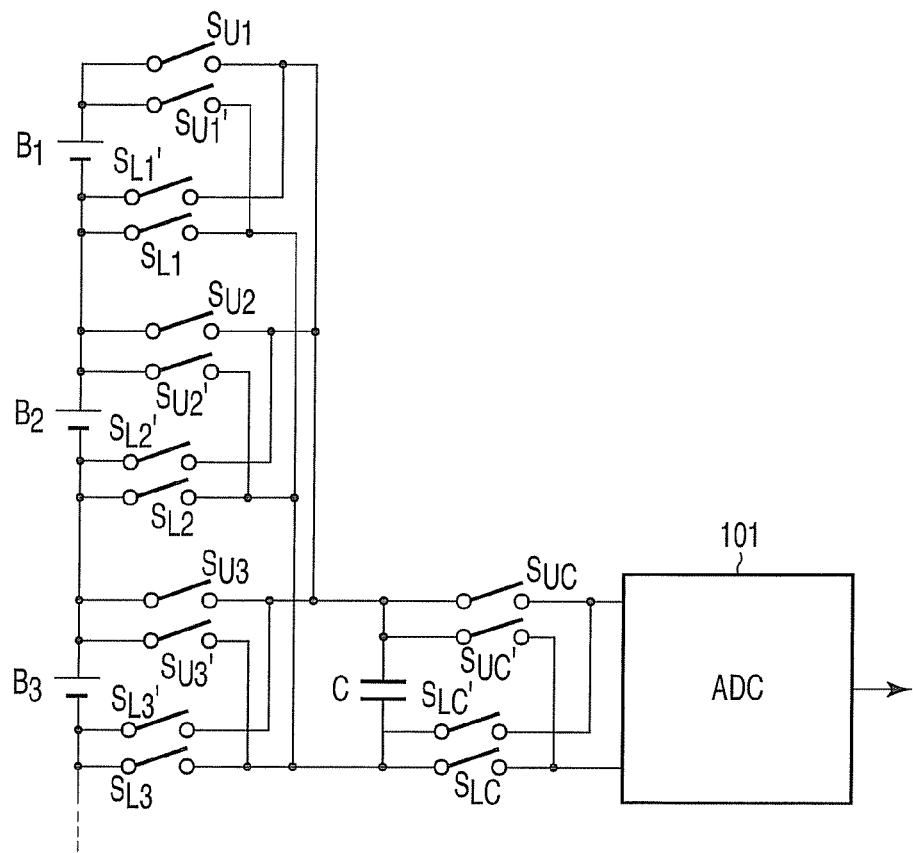
FIG. 5 is a circuit diagram showing part of the protection unit according to a second embodiment.

As described in the first embodiment, the polarity of the voltage of the sampling capacitor C differs between when the voltage of the battery cell is sampled with the switch $S_i$ and when it is sampled with the switch $S_{i'}$. According to the second embodiment shown in FIG. 5, as well as the transmission switches $S_{UC}$, $S_{LC}$ placed between an end of the sampling capacitor C and a positive input terminal of the ADC 101 and between the other end of the sampling capacitor C and a negative input terminal of the ADC 101, transmission switches $S_{UC'}$, $S_{LC'}$ are added between an end of the sampling capacitor C and the negative input terminal of the ADC 101 and between the other end of the sampling capacitor C and the positive input terminal of the ADC 101.

By inverting the polarity of input signal of the ADC 101 between when the switch $S_i$ is on and when the switch $S_{i'}$ is on using the transmission switches $S_{UC'}$, $S_{LC'}$ added in this way, the polarities of output digital values from the ADC 101 can be adjusted to the same one.

(Third Embodiment)

Figure 6:
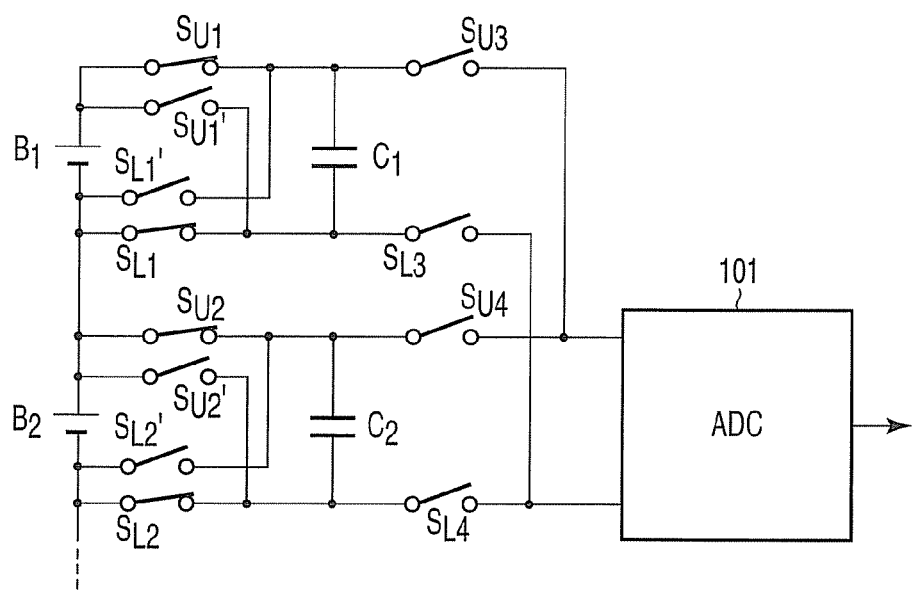
FIG. 6 is a circuit diagram showing part of the protection unit according to a third embodiment.

Although in the first and second embodiments, examples using the flying capacitor voltage detection circuit having a sampling capacitor C have been described, the present invention can be applied to the flying capacitor voltage circuit having a plurality of sampling capacitors, which are provided corresponding to each of the battery cells. The third embodiment shown in FIG. 6 shows an example that sampling capacitors $C_1$, $C_2$ are provided corresponding to the battery cells B1, B2.

Although in the flying capacitor voltage detection circuit having a sampling capacitor as indicated in the first and second embodiments, the voltage of each battery cell is sampled successively one by one, the flying capacitor voltage detection circuit having a plurality of sampling capacitors like this embodiment can sample the voltages of plural battery cells all at once, thereby providing such an advantage that synchronism of voltage detection can be raised.

Figure 7:
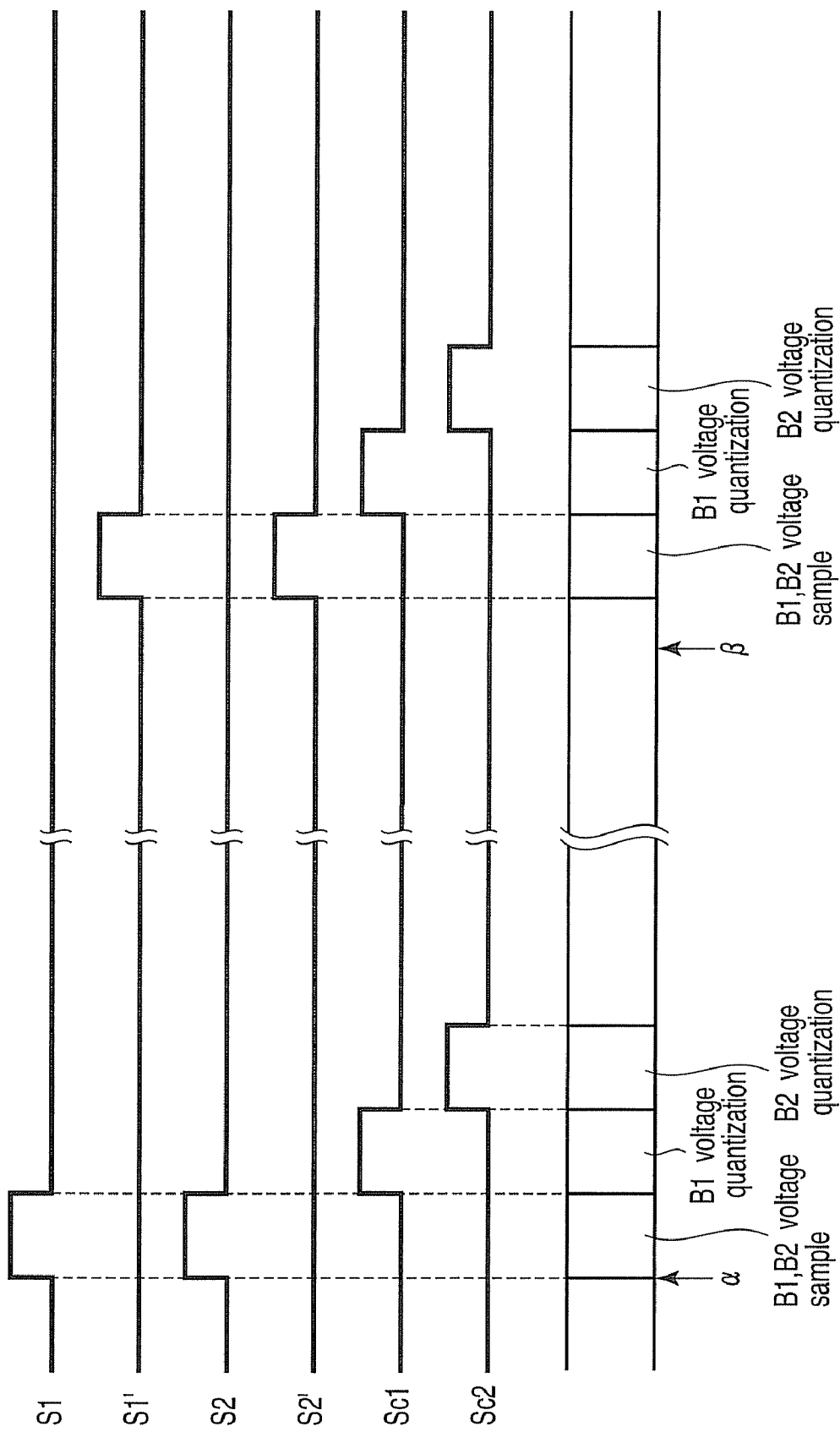
FIG. 7 is a timing chart showing an operation of a switch in the third embodiment.

FIG. 7 is a timing chart of the third embodiment, which is different from FIG. 3 in that the switches $S_{U1}$, $S_{L1}$ and $S_{U2}$, $S_{L2}$ are turned on at the same time as indicated in S1 and S2 and the switches $S_{U1'}$, $S_{L1'}$ and $S_{U2'}$, $S_{L2'}$ are turned on at the same time as indicated in S1', S2'. In FIG. 7, operations of switches for transmitting charges of the sampling capacitors $C_1$, $C_2$ are expressed as $S_{C1}$, $S_{C2}$.

Figure 8:
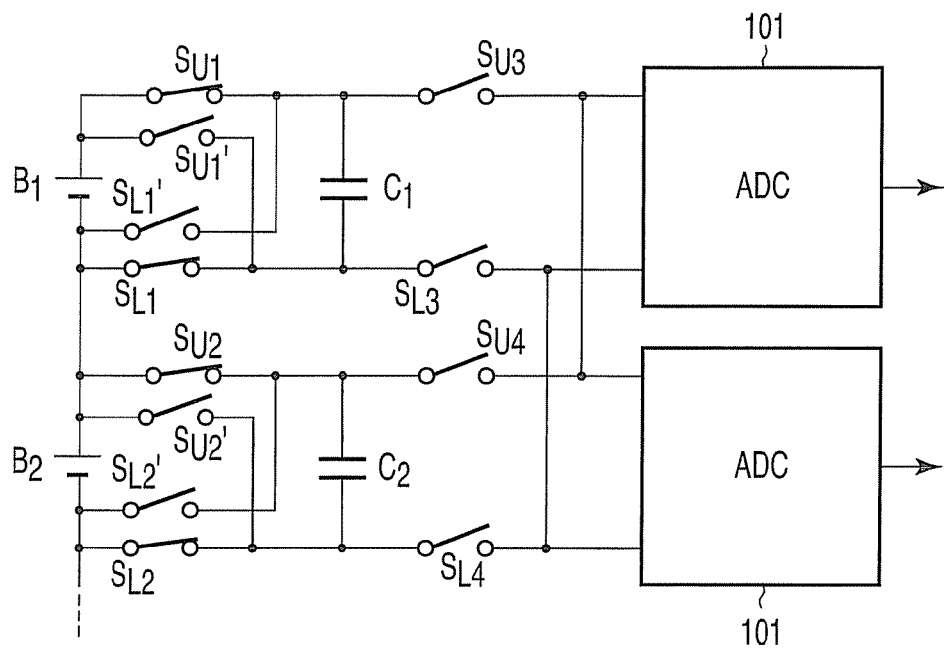
FIG. 8 is a circuit diagram showing a modification of the third embodiment.

FIG. 8 shows a modification of the third embodiment, in which the ADC 101 is provided corresponding to each of the sampling capacitors $C_1$, $C_2$.

(Fourth Embodiment)

Figure 9:
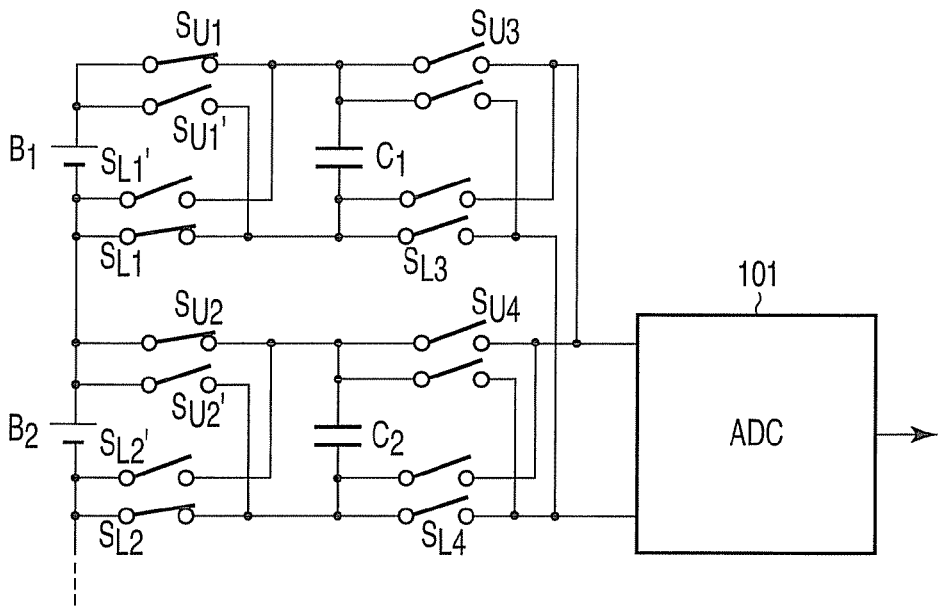
FIG. 9 is a circuit diagram showing part of the protection unit according to a fourth embodiment.

FIG. 9 shows the fourth embodiment of the present invention, in which the same transmission switches $S_{UC'}$, $S_{LC'}$ as described in the second embodiment are added to the third embodiment.

(Fifth Embodiment)

Figure 10:
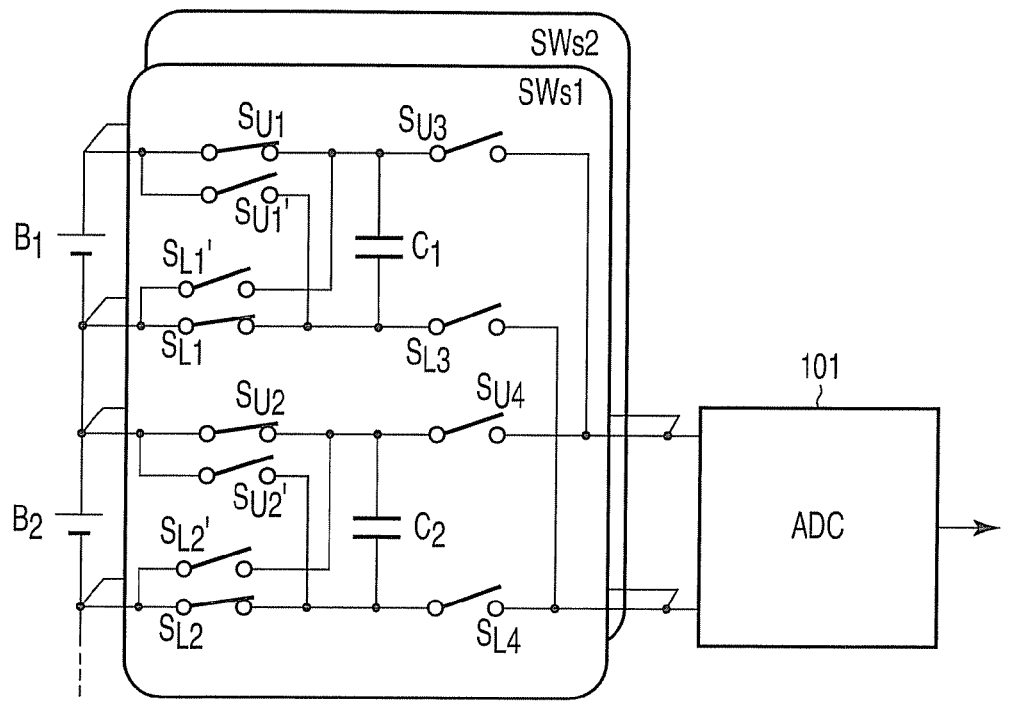
FIG. 10 is a circuit diagram showing part of the protection unit according to a fifth embodiment.

FIG. 10 indicates an example that a plurality (two in this example) of the sampling capacitors are used for a battery cell in order to reduce time required for sampling the voltage of the cell battery. The sampling and connection to the ADC 101 are carried out with two blocks of $SW_S1$, $SW_S2$. For example, by holding the voltage of the battery cell to the capacitor of $SW_S1$ when the voltage value of the capacitor of the block $SW_S2$ is quantized by the ADC 101, a necessity of providing a time for the sampling is eliminated, so that the cell voltage can be detected more rapidly.

(Sixth Embodiment)

Figure 11:
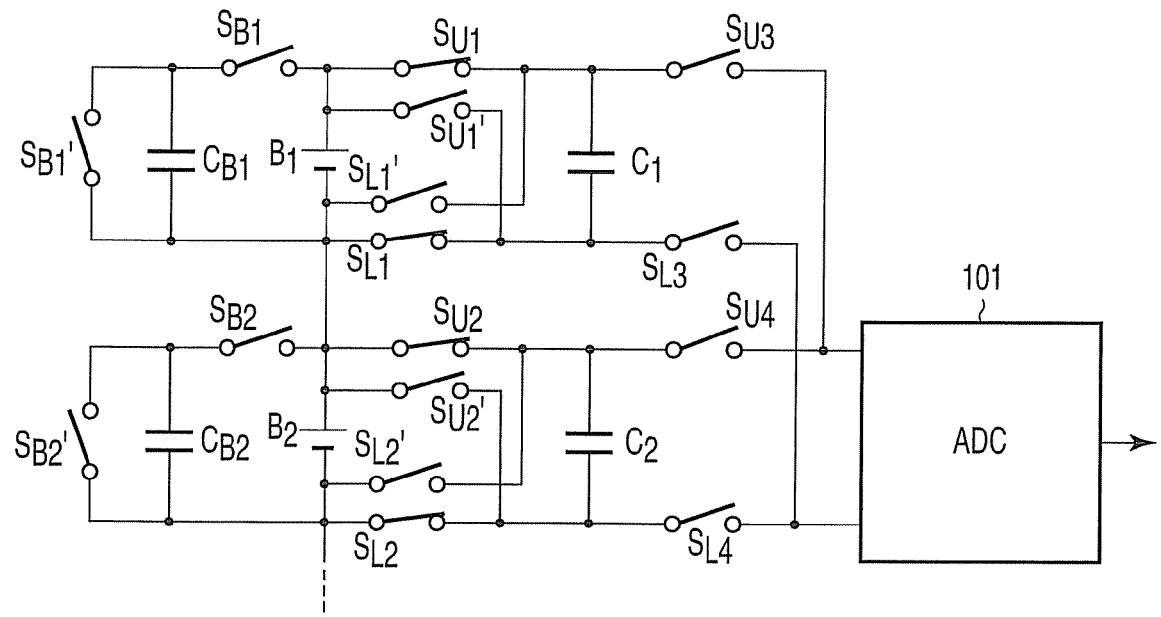
FIG. 11 is a circuit diagram showing part of the protection unit according to a sixth embodiment.

In the sixth embodiment shown in FIG. 11, charging/discharging capacitors $C_{B1}$, $C_{B2}$ for charging/discharging the battery cell are added in addition to the sampling capacitors $C_1$, $C_2$. Further, discharging switches $S_{B1'}$, $S_{B2'}$ for forming a path for discharging of the battery cell and charging switches $S_{B1}$, $S_{B2}$ for forming a path for charging are provided. Further, the aforementioned controller 103 controls the discharging switches $S_{B1'}$, $S_{B2'}$ and the charging switches $S_{B1}$, $S_{B2}$ to allow the battery cell to be charged/discharged repeatedly if the voltage detected value is higher than the average value. Charging/discharging of the charging/discharging capacitors $C_{B1}$, $C_{B2}$ needs to be carried out in different phases and charging needs to be carried out in other phase than in sampling of the sampling capacitors $C_1$, $C_2$.

By using the capacitors $C_{B1}$, $C_{B2}$ for repeating charging/discharging of the battery cell in addition to the sampling capacitor for voltage detection, the dispersion of voltage can be corrected more rapidly. Further, by increasing the capacity and quantity of the capacitors, the correction of the voltage dispersion can be accelerated more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protection device for an assembled battery having a plurality of battery cells (i=1 . . . n) connected in series, comprising:
at least one sampling capacitor;
for battery cell (i), a first switch group including a first switch and a second switch, the first switch being placed between an end of the battery cell (i) and an end of the capacitor, the second switch being placed between an other end of the battery cell (i) and an other end of the capacitor, so that the capacitor samples a voltage of the battery cell (i) and holds the voltage in the capacitor;
for battery cell (i), a second switch group including a third switch and a fourth switch, the third switch being placed between the end of the battery cell (i) and the other end of the capacitor, the fourth switch being placed between the other end of the battery cell (i) and the end of the capacitor, so that the capacitor samples the voltage of the battery cell (i) and holds the voltage in the capacitor;
a detection unit which detects the voltage of the battery cell (i) of the battery cells (i=1 . . . n) based on the voltage sampled using any one of the first switch group and the second switch group and held on the capacitor and outputs the detected value;
a computing unit which computes an average value of detected values corresponding to the battery cells (i=1 . . . n);
a comparator which compares detected value of the battery cell (i) with the average value so as to obtain a result of comparison indicating a relation in size between the both; and
a controller which controls the first switch group and the second switch group, so that if the detected value of the battery cell (i) is higher than the average value according to the comparison result, the capacitor samples the voltage using one of the first switch group and the second switch group, the one of the first switch group and second switch group being not used for detecting a voltage of a battery cell (i−1), and if the detected value of the battery cell (i) is not higher than the average value according to the comparison result, the capacitor samples the voltage of the battery cell (i) using an other one of the first switch group and the second switch group.

2. The protection device according to claim 1, wherein the detection unit includes an analog-digital converter which obtains the detected value by converting a voltage held on the capacitor to a digital value.

3. The protection device according to claim 1, wherein the detection unit includes a memory which stores the detected values corresponding to each of the battery cells.

4. The protection device according to claim 1, wherein the detection unit includes an analog-digital converter which obtains the detected value by converting the voltage held on the capacitor to a digital value, and
the controller is configured to invert a polarity of the digital value obtained by sampling of the second switch group with respect to a polarity of the digital value obtained by sampling of the first switch group.

5. The protection device according to claim 1, wherein the detection unit includes an analog-digital converter including a positive input terminal and a negative input terminal, for obtaining the detected value by converting the voltage held on the capacitor to a digital value.

6. The protection device according to claim 5, further comprising:
a third switch group including a fifth switch and a sixth switch, the fifth switch being placed between an end of the capacitor and the positive input terminal, the sixth switch being placed between the other end of the capacitor and the negative input terminal, to transmit the voltage of the capacitor to the converter; and
a fourth switch group including a seventh switch and a eighth switch, the seventh switch being placed between an end of the capacitor and the negative input terminal, the eighth switch being placed between the other end of the capacitor and the positive input terminal, to transmit the voltage of the capacitor to the converter,
wherein the controller is configured to control the first to fourth switch groups so that when the first switch group samples, the third switch group transmits the voltage of the capacitor to the converter and when the second switch group samples, the fourth switch group transmits the voltage of the capacitor to the converter.

7. The protection device according to claim 6, further comprising:
a charging/discharging capacitor to charge/discharge the battery cells;
a fifth switch group switches to form a path for the discharge; and
a sixth switch group switches to form a path for the charge,
wherein the controller is configured to control the fifth switch group and the sixth switch group so that if the detected value is higher than the average value, the battery cells repeat charging/discharging.

8. An assembled battery system comprising:
an assembled battery having a plurality of battery cells connected in series; and
the protection device according to claim 1.

9. A protection device for an assembled battery having a plurality of battery cells (i=1 . . . n) connected in series, comprising:
at least one sampling capacitor;
for battery cell (i), a first switch group including a first switch and a second switch, the first switch being placed between an end of the battery cell (i) and an end of the capacitor, the second switch being placed between an other end of the battery cell (i) and an other end of the capacitor, so that the capacitor samples a voltage of the battery cell (i), and holds the voltage in the capacitor;
for battery cell (i), a second switch group including a third switch and a fourth switch the third switch being placed between the end of the battery cell (i) and the other end of the capacitor, the fourth switch being placed between the other end of the battery cell (i) and the end of the capacitor, so that the capacitor samples the voltage of the battery cell (i) and holds the voltage in the capacitor;
a detection unit which includes an analog-digital converter having a positive input terminal and a negative input terminal to convert a voltage sampled by any one of the first switch group and the second switch group and held on the capacitor so as to detect voltages of the battery cells (i=1 . . . n) and output the detected value;
a third switch group including a fifth switch and a sixth switch, the fifth switch being placed between an end of the capacitor and the positive input terminal, the sixth switch placed between the other end of the capacitor and the negative input terminal, so as to transmit the voltage of the capacitor to the converter;
a fourth switch group including a seventh switch and a eighth switch, the seventh switch being placed between an end of the capacitor and the negative input terminal, the eighth switch being placed between the other end of the capacitor and the positive input terminal, so as to transmit the voltage of the capacitor to the converter;

a computing unit which computes an average value of the detected values corresponding to each of the battery cells (i=1 ... n);

a comparator which compares the detected value of battery cell (i) with the average value so as to obtain a result of comparison indicating a relation in size between the both; and a controller which controls the first to fourth switch groups so that if the detected value of the battery cell (i) is higher than the average value according to the comparison result, the capacitor samples the voltage using one of the first switch group and the second switch group, the one of the first switch group and the second switch group being not used for detecting a voltage of a battery cell (i−1), if the detected value of the battery cell (i) is not higher than the average value according to the comparison result, the capacitor samples the voltage of the battery cell (i) using an other one of the first switch group and the second switch group, if the first switch group switches samples, the third switch group transmits the voltage of the capacitor to the converter, and if the second switch group samples, the third switch group transmits the voltage of the capacitor to the converter.

10. An assembled battery system comprising:

an assembled battery having a plurality of battery cells connected in series; and the protection device according to claim 9.

* * * * *